Patented Jan. 3, 1933

1,892,741

UNITED STATES PATENT OFFICE

EDWARD E. SORENSEN, OF DETROIT, MICHIGAN, ASSIGNOR, BY DIRECT AND MESNE ASSIGNMENTS, TO PAUL F. SCHOLBE, OF DETROIT, MICHIGAN

REFRIGERANT

No Drawing. Application filed August 24, 1928, Serial No. 301,838. Renewed June 29, 1931.

This invention relates to a refrigerant, and one that is particularly adapted for use with the domestic or household type of automatic refrigerating unit.

Various forms of refrigerants have heretofore been proposed and used commercially, such as ammonia, sulphur dioxide, ethyl chloride, et cetera. These refrigerants have proved more or less satisfactory under special conditions; that is, each have features which make them adaptable for particular insulations.

I have discovered a refrigerant which is very efficient under the best operating conditions existing in most standard refrigerating systems of the compression and expansion or evaporation type.

This particular refrigerant comprises a solution or mixture of nitrous ether (ethyl nitrite) ($C_2H_5NO_2$) and ethyl alcohol ($C_2H_5OH$). This new refrigerant in its preferred form preferably consists of a mixture of 15 parts of nitrous ether and 85 parts of ethyl alcohol by volume. I have found that such a refrigerant may be readily evaporated to a gaseous state under a vacuum of approximately 15 inches, and that during this evaporation or vaporizing operation, such mixture or solution will chill to approximately 5 degrees Fahrenheit.

I have also found that this resulting vaporized gas is easily compressed to liquid form and may be again vaporized innumerable times without materially effecting its efficiency or quality, thus making an ideal refrigerant for a low pressure domestic refrigerating unit.

It will be understood that I do not wish to confine this refrigerant to the exact proportions stated, namely, 15 parts ethyl nitrite and 85 parts ethyl alcohol, as I have found that proportions of said ingredients may run as high as 50 parts of each, and still give measurably good results. I have found, however, that best results are obtained when the nitrous ether does not exceed 20% of the entire solution.

What I claim is:

1. A new product for use as a refrigerant, comprising nitrous ether and ethyl alcohol.

2. A new product for use as a refrigerant, comprising a relatively large amount of ethyl alcohol and a relatively small amount of nitrous ether.

3. A new product for use as a refrigerant, comprising approximately 15 parts by volume of nitrous ether and 85 parts by volume of ethyl alcohol.

In testimony whereof I affix my signature.

EDWARD E. SORENSEN.